(No Model.)
W. S. PICKETT.
Rake.
No. 238,249.  Patented March 1, 1881.
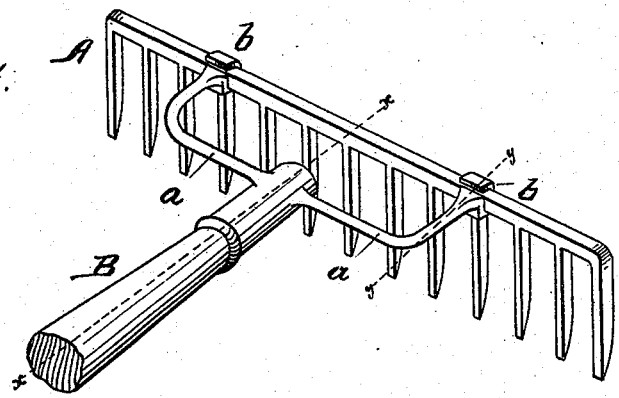
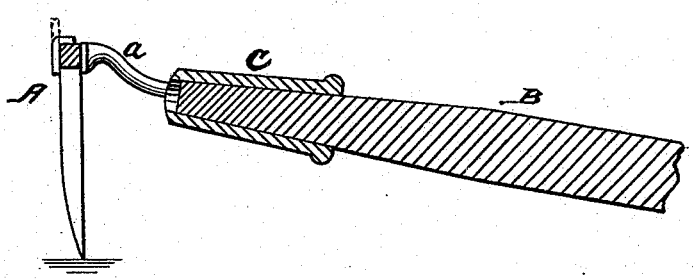
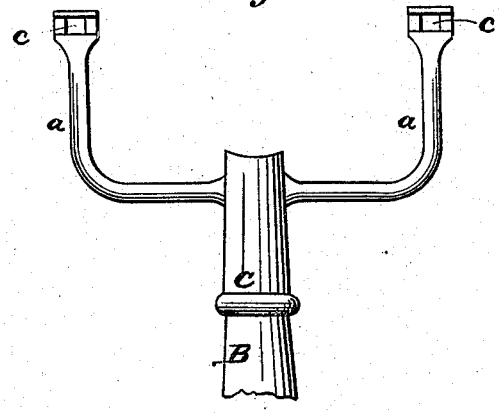 
Witnesses.
Henry Frankfurter.
B. J. Morse
Inventor.
William Stanley Pickett
per. F. F. Warner, his Attorney.

UNITED STATES PATENT OFFICE.

WILLIAM S. PICKETT, OF CHICAGO, ILLINOIS.

RAKE.

SPECIFICATION forming part of Letters Patent No. 238,249, dated March 1, 1881.

Application filed December 10, 1880. (No model.)

*To all whom it may concern:*

Be it known that I, WILLIAM STANLEY PICKETT, of Chicago, in the county of Cook, and State of Illinois, have invented certain new and useful Improvements in Rakes, of which the following, in connection with the accompanying drawings, is a specification.

In the drawings, Figure 1 is a perspective view of a rake embodying my invention. Fig. 2 is a section in the plane of the line $x\,x$. Fig. 3 is a top or plan view of the metal socket and its branching or forked connecting-arms, and Fig. 4 is a section in the plane of the line $y\,y$.

Like letters of reference indicate like parts.

My invention relates to rakes having metallic heads and intended for use in gardens and lawns, and for raking gravel and other like material. My object is to increase the strength and durability of rakes of this class and to improve the mode of connecting the head to the handle; and my invention consists of the means, substantially as hereinafter described, which I employ for the purpose set forth.

A represents the head of the rake, which is made of metal; and B is the handle, which may be made of wood. Both of these parts may be formed as usual in rakes of the class referred to.

C is a ferrule or socket fitted firmly on the lower end of the handle B, and $a\,a$ are branching or forked arms extending laterally and forward from the ferrule C. This ferrule and its arms $a\,a$ are made in one and the same piece of metal, preferably malleable iron, and the forward ends of the arms $a\,a$ are adapted for attachment to head A.

In order to adapt the forward ends of the arms $a\,a$ for attachment to the head A firmly and with facility, I deem it best to make those ends in the form of clips or clasps $b\,b$, in which are holes $c\,c$, each adapted to receive a rake-tooth snugly, as indicated in the drawings.

To apply the clips $b\,b$ to the head A the proper teeth in the head are thrust down through the holes $c\,c$, and the front sides of the clips are then turned down over the head, as shown, it being understood that the clips are long enough for that purpose.

It will be perceived from the foregoing description, and from reference to the drawings, that a rake containing the features of construction now described will be very strong and durable, and that the head will be firmly applied.

Having thus described my invention, what I claim as new, and desire to secure by Letters Patent, is—

The combination of the metallic head A, the handle B, and the metal ferrule or socket C, having thereon arms $a\,a$, terminating at their forward ends in the clips or clasps $b\,b$, the latter being formed to inclose three sides of the longitudinal bar of the head A, and the said socket, its arms, and the said clips or clasps being all made in one and the same piece of malleable metal, and the clips being secured to the head by being bent down thereupon, substantially as shown and described, and for the purposes specified.

WILLIAM STANLEY PICKETT.

Witnesses:
F. F. WARNER,
H. FRANKFURTER.